United States Patent
Liu et al.

(10) Patent No.: US 11,953,705 B2
(45) Date of Patent: Apr. 9, 2024

(54) OPTICAL DEVICE AND PRISM MODULE THEREOF

(71) Applicants: Sintai Optical (Shenzhen) Co., Ltd., ShenZhen (CN); Asia Optical Co., Inc., Taichung (TW)

(72) Inventors: Bin Liu, ShenZhen (CN); Hua-Tang Liu, Taichung (TW)

(73) Assignees: SINTAI OPTICAL (SHENZHEN) CO., LTD., Shenzhen (CN); ASIA OPTICAL CO., INC., Taichung (TW)

( * ) Notice: Subject to any disclaimer, the term of this patent is extended or adjusted under 35 U.S.C. 154(b) by 608 days.

(21) Appl. No.: 17/301,577

(22) Filed: Apr. 8, 2021

(65) Prior Publication Data
US 2021/0325578 A1    Oct. 21, 2021

(30) Foreign Application Priority Data
Apr. 15, 2020   (CN) .......................... 202010297240.8

(51) Int. Cl.
| | |
|---|---|
| G02B 5/04 | (2006.01) |
| G01C 3/08 | (2006.01) |
| G01S 7/481 | (2006.01) |
| G01S 17/08 | (2006.01) |

(52) U.S. Cl.
CPC ................ *G02B 5/04* (2013.01); *G01C 3/08* (2013.01); *G01S 7/481* (2013.01); *G01S 17/08* (2013.01)

(58) Field of Classification Search
CPC .. G02B 5/04; G01C 3/08; G01S 7/481; G01S 17/08; G03B 13/20; G03B 13/36

USPC .......................................................... 359/834
See application file for complete search history.

(56) References Cited

U.S. PATENT DOCUMENTS

| | | | | |
|---|---|---|---|---|
| 2,456,521 | A * | 12/1948 | Maxwell | G02B 23/00 |
| | | | | 359/834 |
| 6,236,504 | B1 * | 5/2001 | Kao | G02B 23/18 |
| | | | | 359/418 |
| 9,500,870 | B2 * | 11/2016 | Zuo | G02B 27/126 |
| 10,520,717 | B2 | 12/2019 | Chen et al. | |
| 10,704,903 | B2 * | 7/2020 | Chen | G02B 23/10 |
| 11,493,828 | B2 * | 11/2022 | Liu | G03B 13/20 |
| 11,796,315 | B2 * | 10/2023 | Liu | G01C 3/02 |
| 2004/0184023 | A1 * | 9/2004 | Kao | G01C 3/08 |
| | | | | 356/4.01 |
| 2011/0051117 | A1 * | 3/2011 | Pernstich | G01S 17/10 |
| | | | | 356/4.01 |

(Continued)

FOREIGN PATENT DOCUMENTS

| | | |
|---|---|---|
| CN | 1655003 A | 8/2005 |
| CN | 202002638 U | 10/2011 |

(Continued)

*Primary Examiner* — Ricky D Shafer
(74) *Attorney, Agent, or Firm* — McClure, Qualey & Rodack, LLP

(57) ABSTRACT

An optical device includes an objective module, a prism module and an ocular module. The prism module includes a first prism, a second prism, a third prism and a first coating. The prism module is disposed between the objective module and the ocular module. A first light beam emitted by an object sequentially passes through the objective module, the prism module and the ocular module. Central axes of the objective module and the ocular module are in parallel without overlapping.

16 Claims, 8 Drawing Sheets

(56) References Cited

U.S. PATENT DOCUMENTS

| | | | | |
|---|---|---|---|---|
| 2015/0055116 A1* | 2/2015 | Liu | ......................... | G01S 7/481 |
| | | | | 359/836 |
| 2019/0242982 A1 | 8/2019 | Wang et al. | | |
| 2020/0088987 A1 | 3/2020 | Zhu et al. | | |

FOREIGN PATENT DOCUMENTS

| | | |
|---|---|---|
| CN | 203274727 U | 11/2013 |
| CN | 104297742 A | 1/2015 |
| CN | 104614849 A | 5/2015 |
| CN | 205537597 U | 8/2016 |
| CN | 107219621 A | 9/2017 |
| CN | 107490851 A | 12/2017 |
| JP | H0545464 A | 2/1993 |
| JP | 2015072136 A | 4/2015 |
| TW | 201734508 A | 10/2017 |
| WO | 2018076600 A1 | 5/2018 |
| WO | 2018167215 A1 | 9/2018 |

* cited by examiner

OPTICAL DEVICE AND PRISM MODULE THEREOF

BACKGROUND OF THE INVENTION

Field of the Invention

The invention relates to an optical device and a prism module thereof, and more particularly to a laser rangefinder and a prism module thereof.

Description of the Related Art

Referring to FIG. 1, a conventional rangefinder 10 includes an objective module (not shown), a prism module 11, an organic light-emitting diode (OLED) 12, a light emitter 13, a light receiver (not shown) and an ocular module (not shown). The prism module 11 is disposed between the objective module and the ocular module and includes a first prism 14, a second prism 15 and a third prism 16. The first prism 14 is disposed to contact the second prism 15. The third prism 16 is disposed near the second prism 15. The OLED 12 and the light emitter 13 are disposed near and at a side of the first prism 14. The third prism 16 is a roof prism. The second prism 15 and the third prism 16 are combined to form a Schmidt-Pechan prism system.

In operation, a first light beam A emitted from an object (not shown) sequentially passes through the objective module, the second prism 15, the third prism 16 and the ocular module to provide an image of the object for user's view. A second light beam B emitted by the OLED 12 is reflected by a reflecting mirror 17 and sequentially passes through the first prism 14, the second prism 15, the third prism 16 and the ocular module to provide an image information and a reticle (generated by the OLED 12) for user's view. A third light beam C emitted by the light emitter 13 is reflected by another reflecting mirror 18, sequentially passes through the first prism 14, the second prism 15 and the objective module, reaches the object, and is reflected back to the light receiver by the object for calculating the distance between the object and the rangefinder 10.

In the prism module 11, however, the roof prism (i.e. the third prism 16) and the Schmidt-Pechan prism system (i.e. the second prism 15 and the third prism 16) generally has a problem of light leakage that affects the image quality and increases the manufacturing cost of the rangefinder 10 when the rangefinder 10 is provided with the prism module 11. If the objective module and the ocular module of the rangefinder 10 are not coaxially arranged, then the prism module 11 will be large and the rangefinder 10 provided with the prism module 11 will be also large. Further, the brightness of the image generated by the MED 12 is reduced due to multi-reflections of the second light beam B in the prism module 11. Further, energy of the third light beam C is attenuated because of the interference between the third light beam C (emitted by the light emitter 13) and the second light beam B (emitted by the OLED 12) which are arranged with their effective optical diameters overlapped.

BRIEF SUMMARY OF THE INVENTION

The invention provides an optical device (rangefinder) which includes a new prism module to reduce the volume, improve the image quality, and ensure that the brightness of the image generated by the display unit and energy of the light beam generated by the light emitter are sufficiently high.

A prism module in accordance with an exemplary embodiment of the invention includes a first prism, a second prism, a third prism and a first coating. The first prism includes a first surface, a second surface, a third surface and a fourth surface wherein the first surface adjoins the third surface, the third surface adjoins the second surface, the second surface adjoins the fourth surface, the fourth surface adjoins the first surface, the first surface is opposite to the second surface, and the third surface is opposite to the fourth surface. The second prism includes a fifth surface, a sixth surface and a seventh surface wherein the fifth surface adjoins the sixth surface and the seventh surface, and the seventh surface of the second prism is disposed beside the third surface of the first prism. The third prism includes an eighth surface, a ninth surface and a tenth surface wherein the eighth surface adjoins the ninth surface and the tenth surface, and the eighth surface of the third prism is disposed to face the sixth surface of the second prism. The first coating is disposed between the third surface and the seventh surface. A first light beam is emitted by an object, enters the first prism through the first surface, is reflected on the fourth surface, sequentially passes through the third surface and the seventh surface, enters the second prism, is reflected on the fifth surface, leaves from the sixth surface of the second prism, enters the third prism through the eighth surface, is sequentially reflected on the ninth surface and the tenth surface, passes through the eighth surface and leaves the third prism. The first light beam passes through the first coating and propagates towards the seventh surface.

In another exemplary embodiment, the first prism is a rhomboidal prism, and the first coating is formed on the third surface of the first prism.

An optical device in accordance with an exemplary embodiment of the invention includes an objective module, the above-mentioned prism module and an ocular module. The prism module is disposed between the objective module and the ocular module, the first light beam sequentially passes through the objective module, the prism module and the ocular module, and central axes of the objective module and the ocular module are in parallel without overlapping.

In another exemplary embodiment, the optical device further includes a display unit disposed at a side of the sixth surface of the second prism and configured to emit a second light beam wherein the second light beam enters the second prism through the sixth surface, is sequentially reflected on the seventh surface and the fifth surface, passes through the sixth surface, leaves the second prism, enters the third prism through the eighth surface, is sequentially reflected on the ninth surface and the tenth surface, passes through the eighth surface, leaves the third prism, and passes through the ocular module.

In yet another exemplary embodiment, the first coating is configured to reflect the second light beam but allows the first light beam to pass therethrough.

In another exemplary embodiment, the optical device further includes a light emitter and a light receiver wherein the light emitter is configured to emit a third light beam, the light receiver is configured to receive the third light beam reflected by the object for calculating a distance between the object and the optical device, and the first coating is formed on the third surface of the first prism and is configured to reflect the third light beam but allows the first light beam to pass therethrough.

In yet another exemplary embodiment, the light emitter is disposed at a side of the second surface of the first prism, the third light beam enters the first prism through the second surface, is sequentially reflected on the third surface and the fourth surface, leaves from the first surface of the first prism, passes through the objective module, leaves the optical device, reaches the object, is reflected by the object, returns to the optical device, and is received by the light receiver.

In another exemplary embodiment, the light receiver is disposed at a side of the second surface of the first prism, and the third light beam passes through the objective module, leaves the optical device, reaches the object, is reflected by the object, returns to the optical device, passes through the objective module, enters the first prism through the first surface, is sequentially reflected on the fourth surface and the third surface, leaves from the second surface of the first prism, and is received by the light receiver.

In yet another exemplary embodiment, the optical device further includes a light emitter and a light receiver wherein the light emitter is configured to emit a third light beam, the light receiver is configured to receive the third light beam reflected by the object for calculating a distance between the object and the optical device, and the first coating is configured to reflect the second light beam and the third light beam but allows the first light beam to pass therethrough.

In another exemplary embodiment, an optical device includes an objective module, a prism module and an ocular module. The prism module includes a first prism, a second prism, a third prism and a first coating wherein the first prism includes a first surface, a second surface, a third surface and a fourth surface; the second prism includes a fifth surface, a sixth surface and a seventh surface; the seventh surface of the second prism adjoins the third surface of the first prism; the third prism includes an eighth surface, a ninth surface and a tenth surface; the eighth surface is disposed to face the sixth surface of the second prism; the first coating is disposed between the third surface and the seventh surface; a first light beam is emitted by an object, enters the first prism through the first surface, is reflected on the fourth surface, sequentially passes through the third surface and the seventh surface, enters the second prism, is reflected on the fifth surface, leaves from the sixth surface of the second prism, enters the third prism through the eighth surface, is sequentially reflected on the ninth surface and the tenth surface, passes through the eighth surface and leaves the third prism; and the first light beam passes through the first coating and propagates towards the seventh surface. The prism module is disposed between the objective module and the ocular module. The first light beam sequentially passes through the objective module, the prism module and the ocular module. Central axes of the objective module and the ocular module are in parallel without overlapping.

DETAILED DESCRIPTION OF THE INVENTION

The optical device in a first embodiment of the invention is a rangefinder, including two optical systems. The difference between the two optical systems is that one is provided with a light emitter and the other is provided with a light receiver. Other elements and arrangements of the two optical systems are the same. For concision, only one optical system is described with the accompanying drawings in detail as follows.

Figure 1:
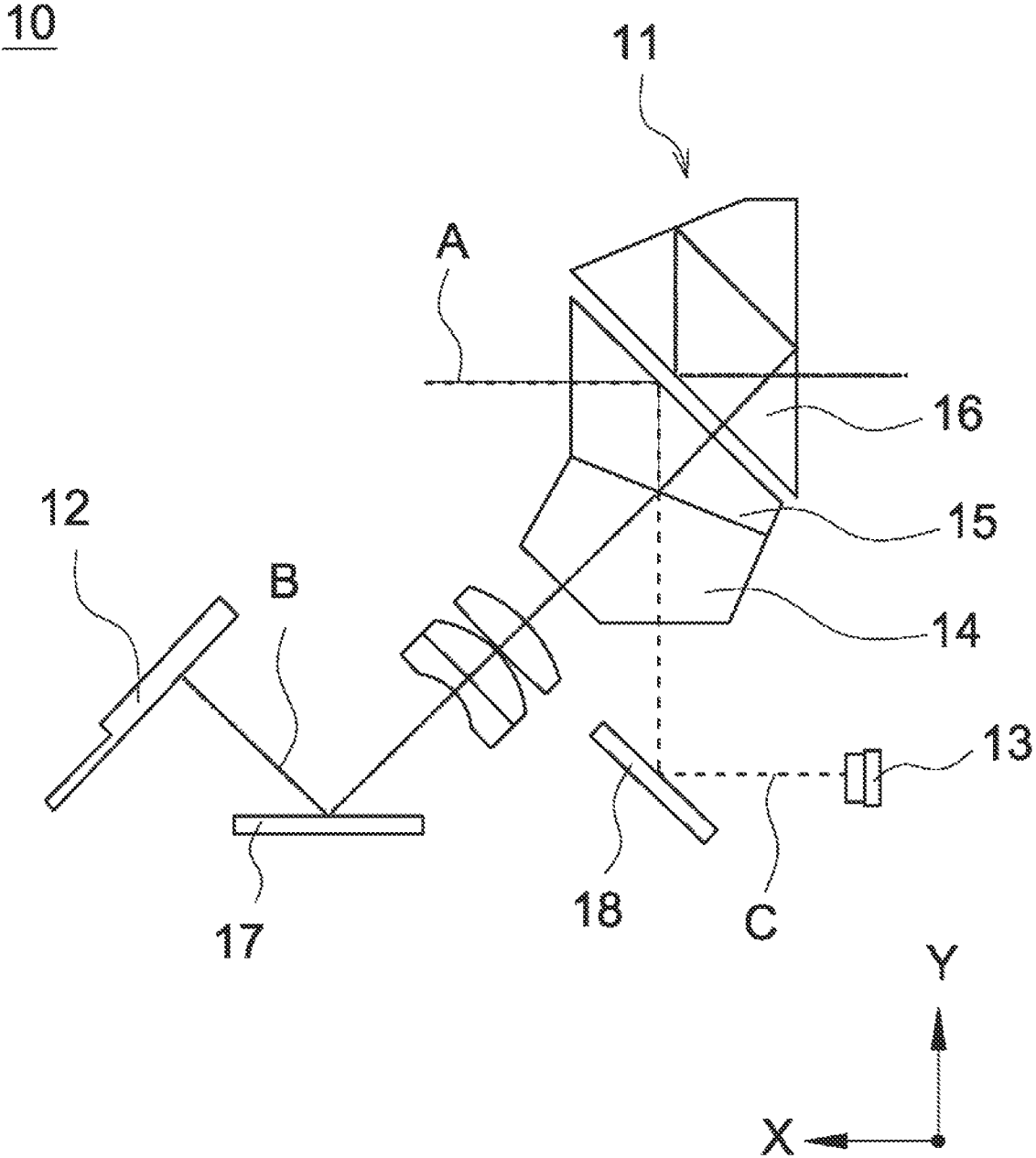
FIG. 1 depicts a structure of a conventional rangefinder.
Figure 2A:
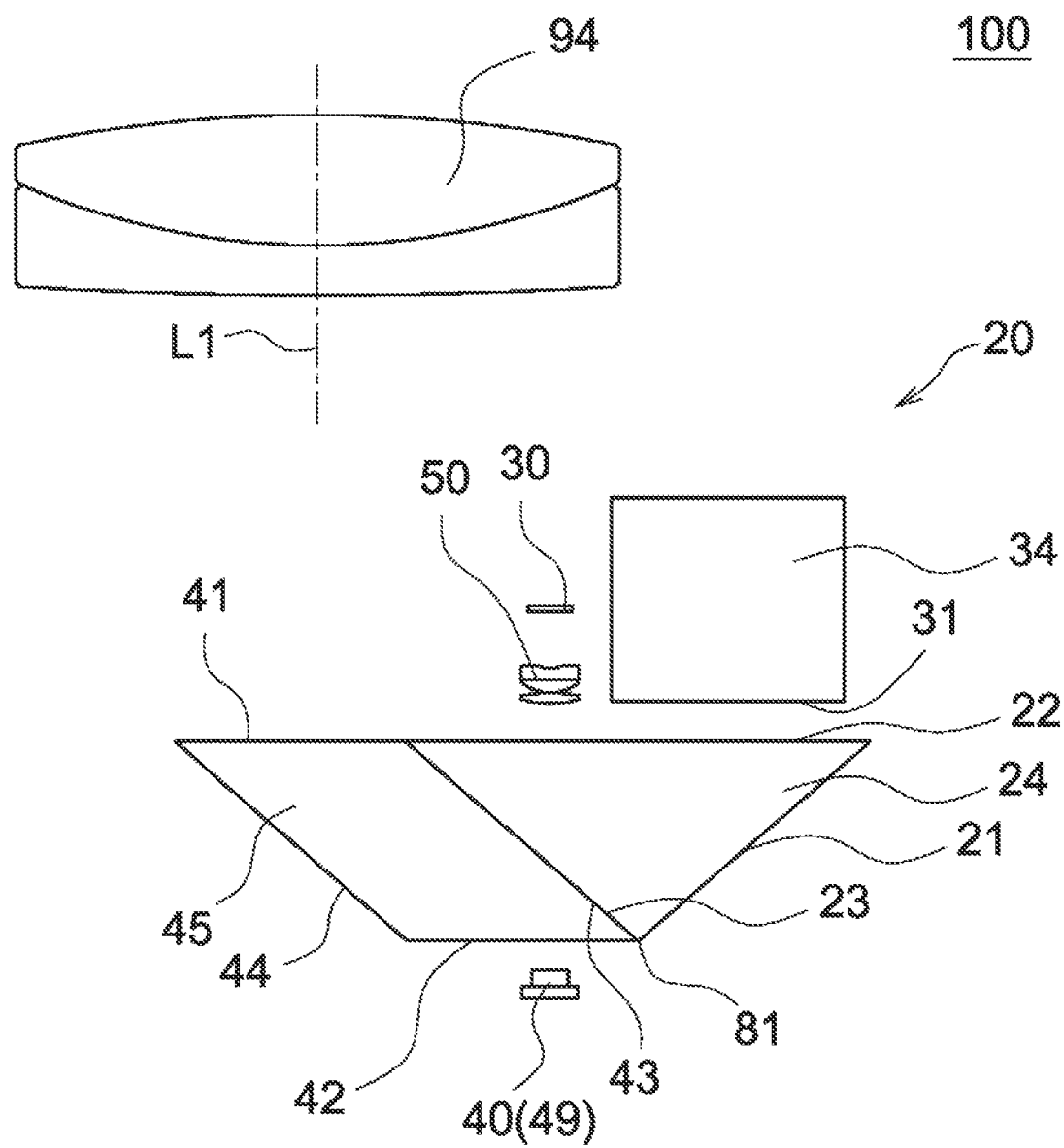
FIG. 2A is a top view of a rangefinder in accordance with a first embodiment of the invention.
Figure 2B:
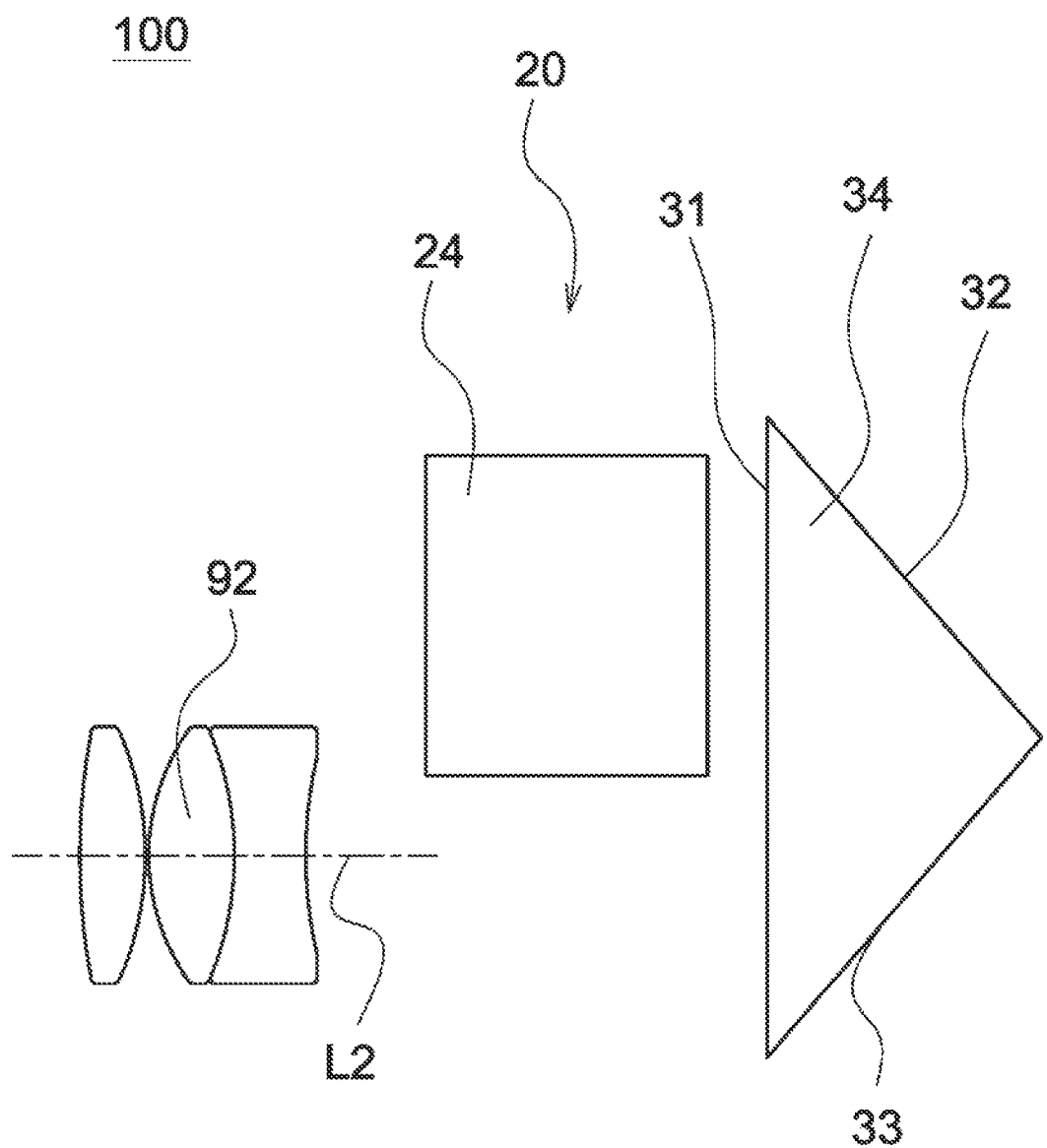
FIG. 2B is a right view of the rangefinder in accordance with the first embodiment of the invention.
Figure 3A:
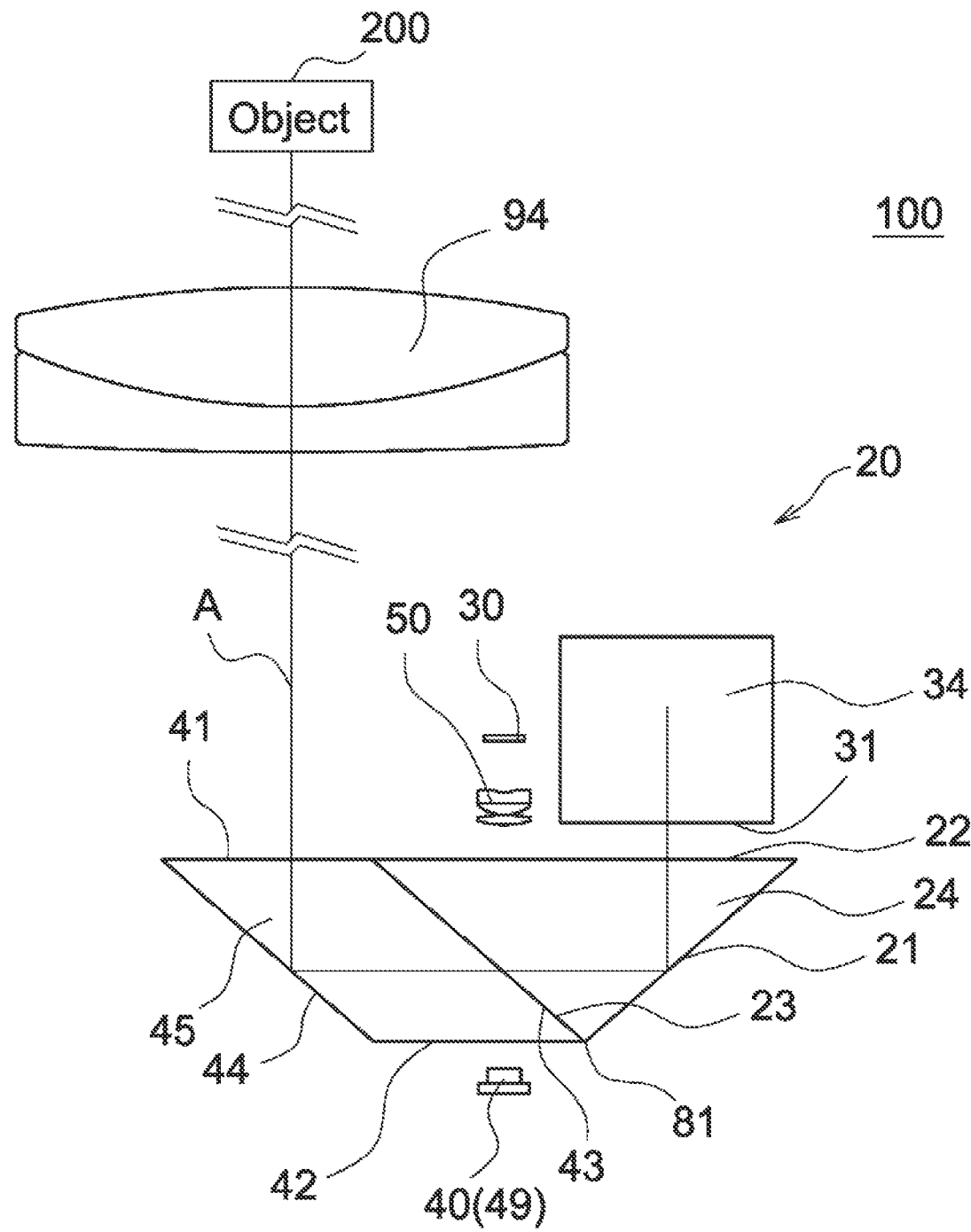
FIG. 3A depicts a light path in which a first light beam propagates in the rangefinder of FIG. 2A.
Figure 3B:
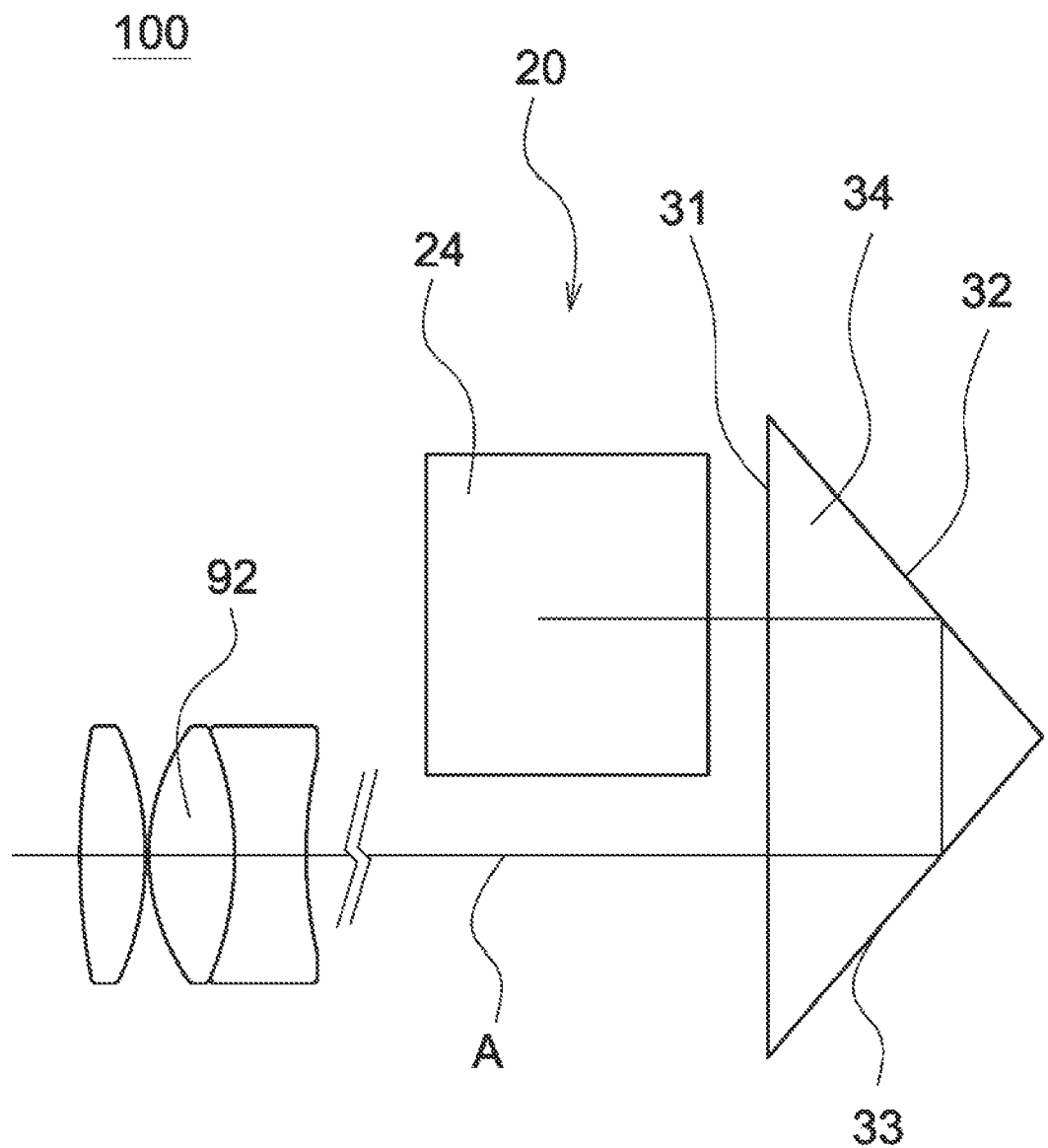
FIG. 3B depicts a light path in which the first light beam propagates in the rangefinder of FIG. 2B.
Figure 4A:
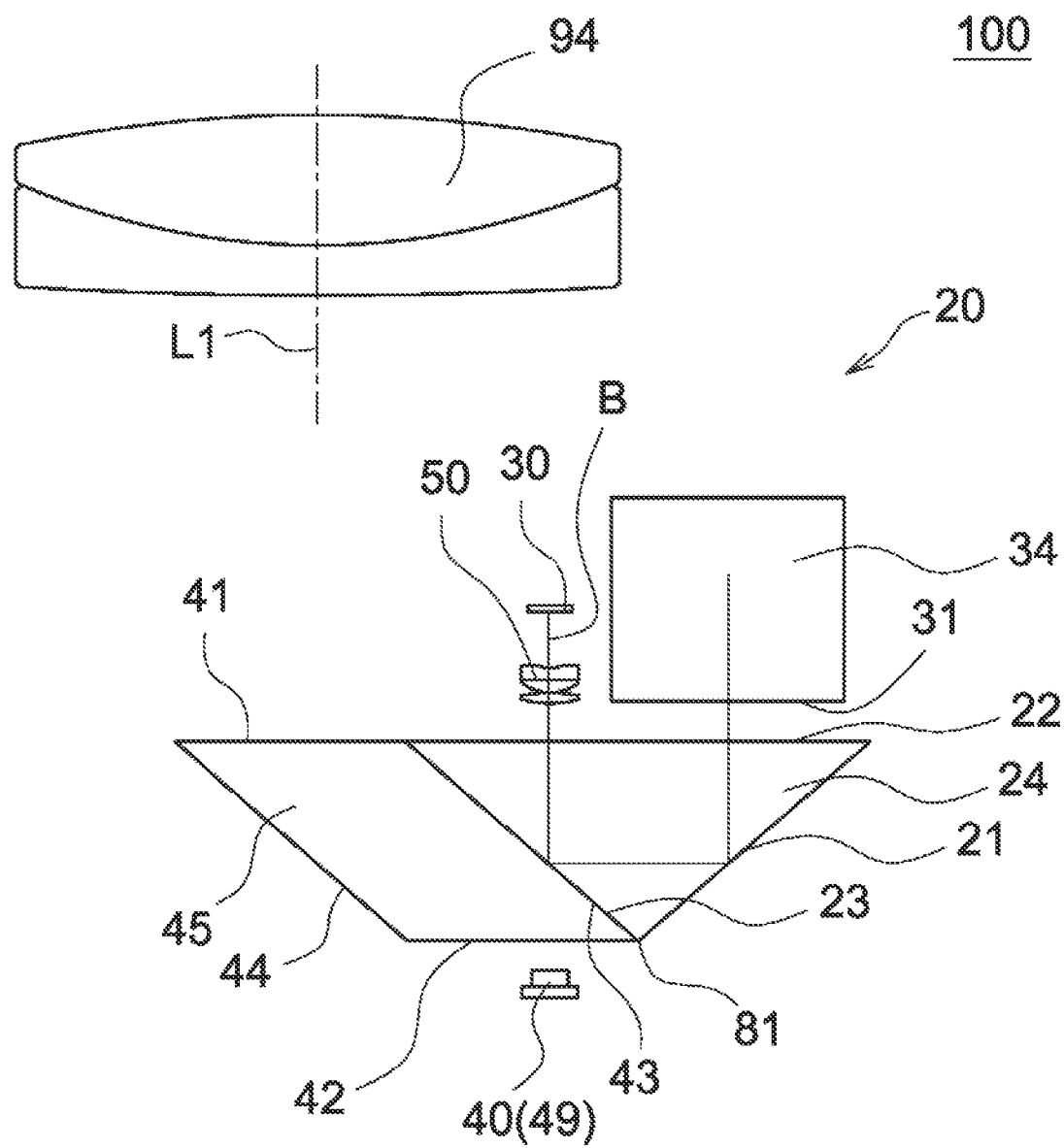
FIG. 4A depicts a light path in which a second light beam propagates in the rangefinder of FIG. 2A.
Figure 4B:
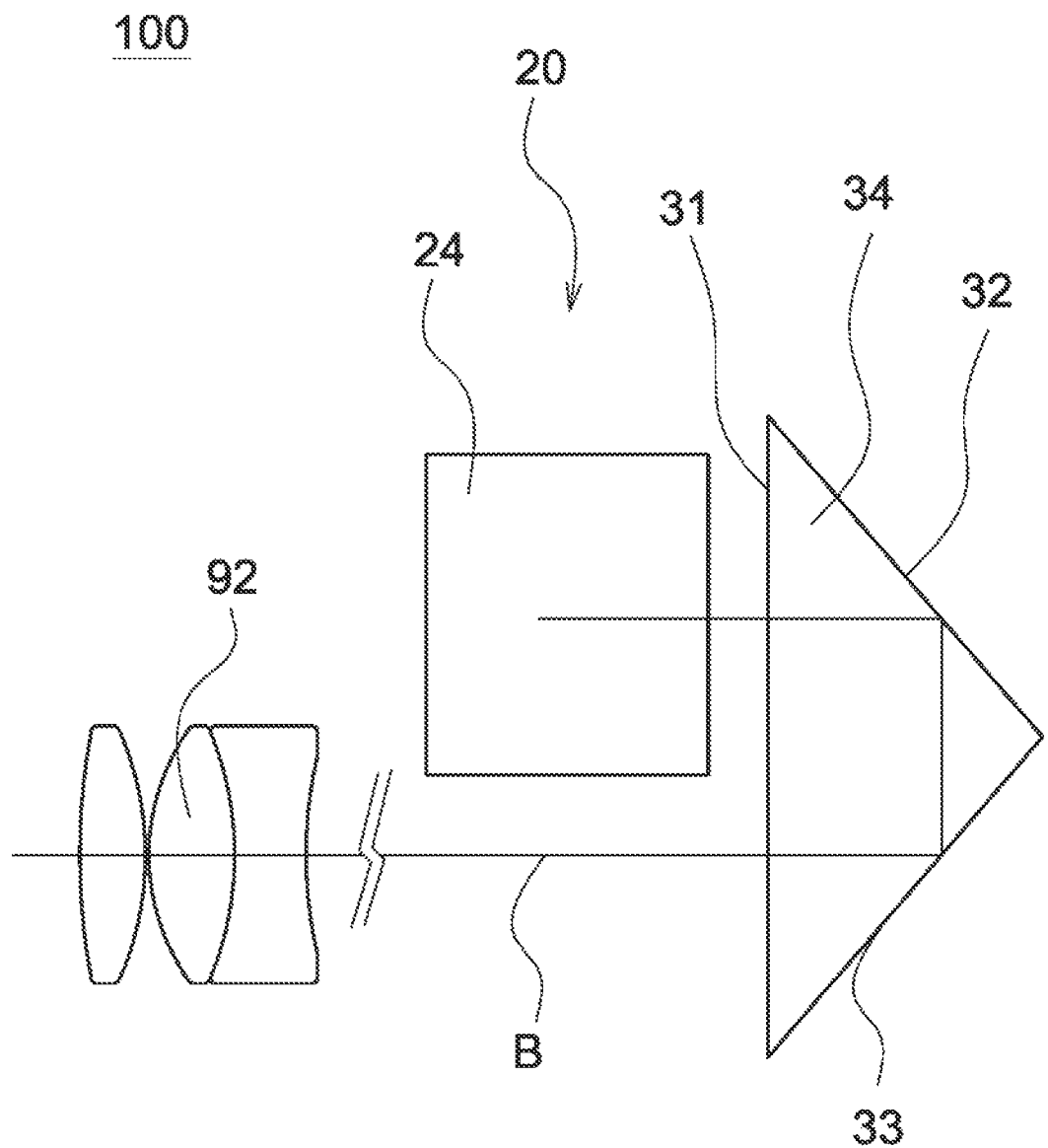
FIG. 4B depicts a light path in which the second light beam propagates in the rangefinder of FIG. 2B.
Figure 5:
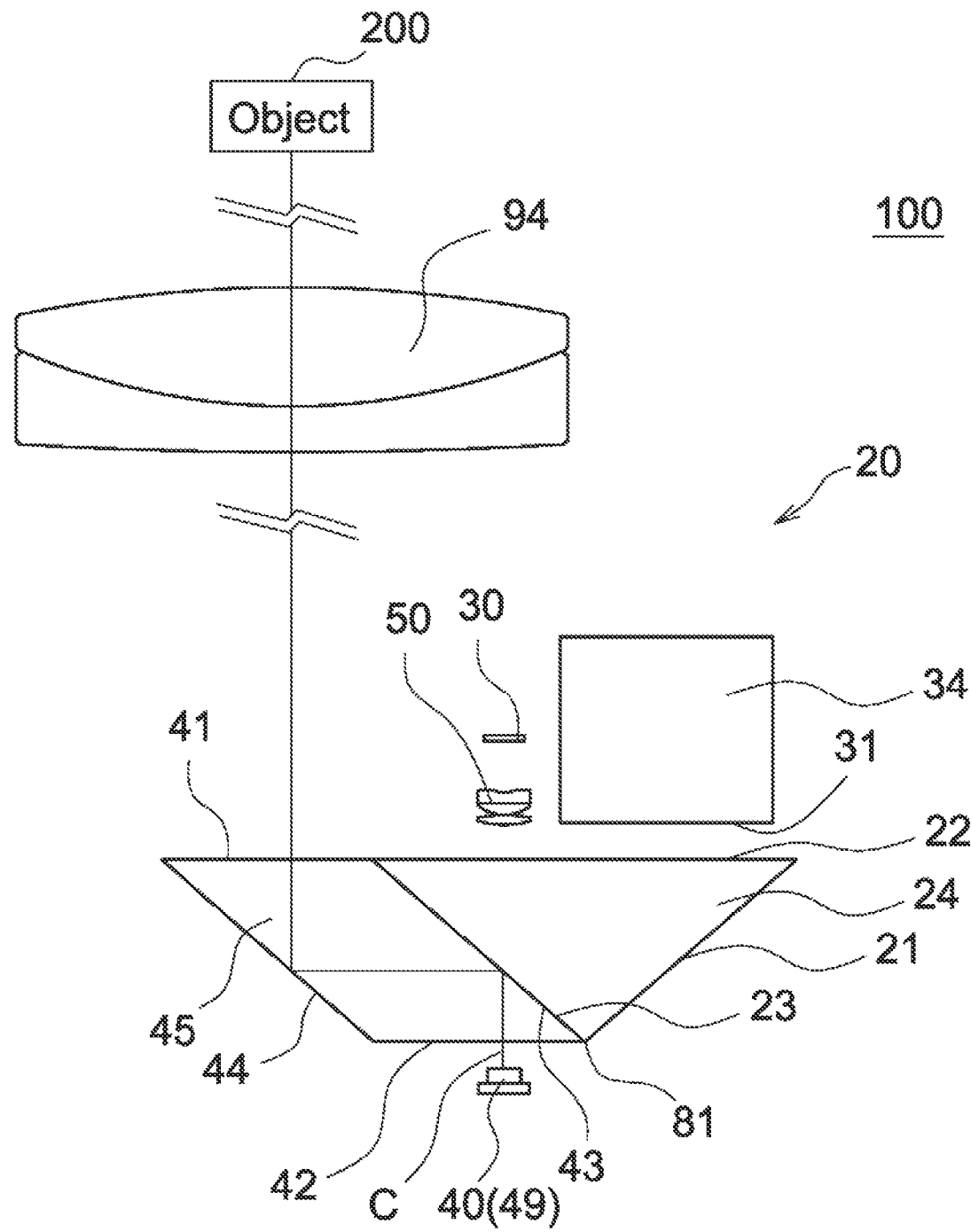
FIG. 5 depicts a light h in which a third light beam propagates in the rangefinder of FIG. 2A.

FIGS. 2A and 2B depict a part of a rangefinder 100 in accordance with a first embodiment of the invention, wherein the part of the rangefinder 100 includes an objective module 94, a prism module 20, a display unit 30, a light emitter 40, a lens unit 50 and an ocular module 92. It is understood that another part of the rangefinder 100 is the same as the above-mentioned part except that the above-mentioned light emitter 40 is replaced with a light receiver 49. Referring to FIGS. 3A and 3B, a first light beam A emitted by an object 200 sequentially passes the objective module 94, the prism module 20 and the ocular module 92. Referring to FIGS. 4A and 4B, a second light beam B emitted by the display unit 30 sequentially passes through the prism module 20 and the ocular module 92. Referring to FIG. 5, a third light beam C emitted by the light emitter 40 sequentially passes through the lens module 20 and the objective module 94, reaches the object 200, is reflected back to the rangefinder 100 by the object 200, and is received by the light receiver 42. Accordingly, the user is able to view the image of the object 200 and the image generated by the display unit 30 through the ocular module 92, and is able to know the distance between the object 200 and the rangefinder 100. The rangefinder 100 may be a binocular rangefinder or a monocular rangefinder. The structure and operation of the rangefinder 100 are described in detail below.

The prism module 20 is disposed between the objective module 94 and the ocular module 92 and includes a first prism 45, a second prism 24 and a third prism 34. In the first embodiment, the first prism 45 is a rhomboidal prism including a first surface 41, a second surface 42, a third surface 43 and a fourth surface 44 wherein an anti-reflective coating is formed on the first surface 41, an anti-reflective coating is formed on the second surface 42 allowing the third light beam C to pass therethrough, and a first coating 81 is formed on the third surface 43. The first coating 81 is configured to reflect the second light beam B and the third light beam C but allows the first light beam A to pass therethrough. The second prism 24 is a triangular prism or a right-angle prism, includes a fifth surface 21, a sixth surface 22 and a seventh surface 23 wherein an anti-reflective coating is formed on the sixth surface 22. Referring to FIG. 2B, the third prism 34 is a triangular prism or a right-angle prism, includes an eighth surface 31, a ninth surface 32 and a tenth surface 33 wherein an anti-reflective coating is formed on the eighth surface 31.

The first surface 41 of the first prism 45 is disposed to face the objective module 94. The seventh surface 23 of the second prism 24 is disposed adjacent to the third surface 43 of the first prism 45. An upper portion of the eighth surface 31 of the third prism 34 is disposed adjacent to the sixth surface 22 of the second prism 24, while a lower portion of the eighth surface 31 of the third prism 34 is disposed to face the ocular module 92. Neither roof prism nor Schmidt-Pechan prism system is provided in the prism module 20 of the invention, so the problem of light leakage can be avoided. By such arrangement, therefore, a rangefinder 100 provided with the prism module 20 can be manufactured in a reduced cost and can provide better image quality. As shown in FIG. 2A, the display unit 30 is disposed at a side of the sixth surface 22 of the second prism 24. The lens unit 50 is disposed between the display unit 30 and the sixth surface 22 of the second prism 24. The light emitter 40 is disposed at a side of the second surface 42 of the first prism 45.

In the first embodiment, the display unit 30 is an organic light-emitting diode (OLED), a liquid crystal display (LCD) or other displays. The first light beam A is a visible light beam. The second light beam B is an image light beam. The third light beam is a laser beam or an invisible light beam.

As shown in FIGS. 3A and 3B, after emitted by the object 200, the first light beam A enters the rangefinder 100, passes through the objective module 94, enters the first prism 45 through the first surface 41, is reflected by the fourth surface 44, sequentially passes through the third surface 43 and the seventh surface 23, enters the second prism 24, is reflected on the fifth surface 21, leaves from the sixth surface 66 of the second prism 24, enters the third prism 34 through the upper portion of the eighth surface 31, is reflected on the ninth surface 32 and then reflected on the tenth surface 33, passes through the lower portion of the eighth surface 31, leaves the prism module 20, and passes through the ocular module 92 for user's view (to view the image of the object 200). It is worth noting that an axis along which the first light beam A propagates before reflected by the first reflecting unit 60 and another axis along which the first light beam A propagates after leaving the prism module 20 are not coaxial. Therefore, the objective module 94 and the ocular module 92 can be arranged along different axes in the rangefinder 100, without increasing the volume of the prism module 20. In other words, a central axis L1 (FIG. 2A) of the objective module 94 and a central axis L2 (FIG. 2B) of the ocular module 92 do not overlap but are in parallel. By such arrangement, the rangefinder 100 (e.g. binocular rangefinder) can have a reduced pupil distance and a reduced volume.

As shown in FIGS. 4A and 4B, the second light beam B emitted by the display unit 30 passes through the lens unit 50, enters the second prism 24 through the sixth surface 22, is reflected on the seventh surface 23 and then reflected on the fifth surface 21, passes through the sixth surface 22, leaves the second prism 24, enters the third prism 34 through the upper portion of the eighth surface 31, is reflected on the ninth surface 32 and then reflected on the tenth surface 33, passes through the lower portion of the eighth surface 31, leaves the prism module 20, and passes through the ocular module 92 for user's view (for the user to view the image generated by the display unit 30). After passing through the prism module 20, the second light beam B of the invention is reflected fewer times than that of the prior art. In the invention, therefore, reduction of the brightness of the image generated by the display unit 30 can be avoided.

As shown in FIG. 5, the third light beam C emitted by the light emitter 40 enters the first prism 45 through the second surface 42, is reflected on the third surface 43 and then reflected on the fourth surface 44, leaves from the first surface 41 of the first prism 45, passes through the objective module 94, and reaches the object 200. Then, the third light beam C is reflected by the object 200, returns to the rangefinder 100, and is received by the light receiver 49 for calculating the distance between the object 200 and the rangefinder 100. Thanks to the prism module 20, the effective optical diameter of the third light beam C (emitted by the light emitter 40) and that of the second light beam B (emitted by the display unit 30) do not overlap and the interference therebetween can be avoided. Therefore, energy of the third light beam C emitted by the light emitter 40 can be increased.

In a second embodiment of the invention, the light emitter 40 and the light receiver 49 exchange their locations. That is, the light receiver 49 is disposed at a side of the second surface 42 of the first prism 45. In operation, the third light beam C emitted by the light emitter 40 is reflected by the object 200, sequentially passes through the objective module 94 and the prism module 20, and reaches the light receiver 49. Specifically, after passing through the objective module 94, the third light beam C enters the first prism 45 through the first surface 41, is reflected on the fourth surface 44 and then reflected on the third surface 43, leaves from the second surface 42 of the first prism 45, and reaches the light receiver 49. The light receiver 49 receives the third light beam C reflected by the object 200 so that the rangefinder can calculate the distance between the object 200 and the rangefinder 100. Other arrangement and operation of the second embodiment are the same as those of the first embodiment, and therefore the descriptions thereof are omitted.

In a third embodiment, the optical path of the second light beam B of FIGS. 4A and 4B is not utilized for user's view. Instead, the user directly views the display unit 30 to obtain the image information. Other arrangement and operation of the third embodiment are the same as those of the first embodiment and the second embodiment, and therefore the descriptions thereof are omitted.

The prism module 20 includes a first prism 45, a second prism 24 and a third prism 34. The first prism 45 includes a first surface 41, a second surface 42, a third surface 43 and a fourth surface 44. The second prism 24 includes a fifth surface 21, a sixth surface 22 and a seventh surface 23. The seventh surface 23 of the second prism 24 is disposed adjacent to the third surface 43 of the first prism 45. The third prism 34 includes an eighth surface 31, a ninth surface 32 and a tenth surface 33. The eighth surface 31 of the third prism 34 is disposed to face the sixth surface 22 of the second prism 24. A first coating 81 is disposed between the third surface 43 and the seventh surface 23. In operation, a first light beam A emitted by an object 200 enters the first prism 45 through the first surface 41, is reflected on the fourth surface 44, sequentially passes through the third surface 43 and the seventh surface 23, enters the second prism 24, is reflected on the fifth surface 21, leaves from the sixth surface 22 of the second prism 24, enters the third prism 34 through the eighth surface 31, is reflected on the ninth surface 32 and then reflected on the tenth surface 33, passes through the eighth surface 31 and leaves the third prism 34. The first light beam A is reflected by the first coating 81 towards the seventh surface 23. Thanks to the new structure of the prism module 20, the volume can be reduced and the image quality can be promoted. Specifically, the seventh surface 23 of the second prism 24 is disposed adjacent to the third surface 43 of the first prism 45. The upper portion of the eighth surface 31 of the third prism 34 is disposed adjacent to the sixth surface 22 of the second prism 24. The prism module 20 of the invention is provided with neither roof prism nor Schmidt-Pechan prism system so that the problem of light leakage can be avoided. By such arrangement, therefore, a rangefinder 100 provided with the prism module 20 can be manufactured in a reduced cost and can provide better image quality. Further, the first light beam A is only reflected four times in the prism module 20. Therefore, the brightness of the first light beam A generated by the object 200 is not reduced.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A prism module, comprising:
    a first prism comprising a first surface, a second surface, a third surface and a fourth surface wherein the first surface adjoins the third surface, the third surface adjoins the second surface, the second surface adjoins the fourth surface, the fourth surface adjoins the first surface, the first surface is opposite to the second surface, and the third surface is opposite to the fourth surface;
    a second prism comprising a fifth surface, a sixth surface and a seventh surface wherein the fifth surface adjoins the sixth surface and the seventh surface, and the seventh surface of the second prism is disposed beside the third surface of the first prism;
    a third prism comprising an eighth surface, a ninth surface and a tenth surface wherein the eighth surface adjoins the ninth surface and the tenth surface, and the eighth surface of the third prism is disposed to face the sixth surface of the second prism;
    a first coating disposed between the third surface and the seventh surface;
    wherein a first light beam is emitted by an object, enters the first prism through the first surface, is reflected on the fourth surface, sequentially passes through the third surface and the seventh surface, enters the second prism, is reflected on the fifth surface, leaves from the sixth surface of the second prism, enters the third prism through the eighth surface, is sequentially reflected on the ninth surface and the tenth surface, passes through the eighth surface and leaves the third prism;
    wherein the first light beam passes through the first coating and propagates towards the seventh surface.

2. The prism module as claimed in claim 1, wherein the first prism is a rhomboidal prism, and the first coating is formed on the third surface of the first prism.

3. An optical device comprising:
    an objective module;
    the prism module as claimed in claim 1; and
    an ocular module;
    wherein the prism module is disposed between the objective module and the ocular module, the first light beam sequentially passes through the objective module, the prism module and the ocular module, and central axes of the objective module and the ocular module are in parallel without overlapping.

4. The optical device as claimed in claim 3, further comprising a display unit disposed at a side of the sixth surface of the second prism and configured to emit a second light beam wherein the second light beam enters the second prism through the sixth surface, is sequentially reflected on the seventh surface and the fifth surface, passes through the sixth surface, leaves the second prism, enters the third prism through the eighth surface, is sequentially reflected on the ninth surface and the tenth surface, passes through the eighth surface, leaves the third prism, and passes through the ocular module.

5. The optical device as claimed in claim 4, wherein the first coating is configured to reflect the second light beam but allows the first light beam to pass therethrough.

6. The optical device as claimed in claim 4, further comprising a light emitter and a light receiver wherein the light emitter is configured to emit a third light beam, the light receiver is configured to receive the third light beam reflected by the object for calculating a distance between the object and the optical device, and the first coating is configured to reflect the second light beam and the third light beam but allows the first light beam to pass therethrough.

7. The optical device as claimed in claim 3, further comprising a light emitter and a light receiver wherein the light emitter is configured to emit a third light beam, the light receiver is configured to receive the third light beam reflected by the object for calculating a distance between the object and the optical device, and the first coating is formed on the third surface of the first prism and is configured to reflect the third light beam but allows the first light beam to pass therethrough.

8. The optical device as claimed in claim 7, wherein the light emitter is disposed at a side of the second surface of the first prism, the third light beam enters the first prism through the second surface, is sequentially reflected on the third surface and the fourth surface, leaves from the first surface of the first prism, passes through the objective module, leaves the optical device, reaches the object, is reflected by the object, returns to the optical device, and is received by the light receiver.

9. The optical device as claimed in claim 7, wherein the light receiver is disposed at a side of the second surface of the first prism, and the third light beam passes through the objective module, leaves the optical device, reaches the object, is reflected by the object, returns to the optical device, passes through the objective module, enters the first prism through the first surface, is sequentially reflected on the fourth surface and the third surface, leaves from the second surface of the first prism, and is received by the light receiver.

10. An optical device comprising:
    an objective module;
    a prism module comprising a first prism, a second prism, a third prism and a first coating wherein the first prism comprises a first surface, a second surface, a third surface and a fourth surface; the second prism comprises a fifth surface, a sixth surface and a seventh surface; the seventh surface of the second prism adjoins the third surface of the first prism; the third prism comprises an eighth surface, a ninth surface and a tenth surface; the eighth surface is disposed to face the sixth surface of the second prism; the first coating is disposed between the third surface and the seventh surface; a first light beam is emitted by an object, enters the first prism through the first surface, is reflected on the fourth surface, sequentially passes through the third surface and the seventh surface, enters the second prism, is reflected on the fifth surface, leaves from the sixth surface of the second prism, enters the third prism through the eighth surface, is sequentially reflected on the ninth surface and the tenth surface, passes through the eighth surface and leaves the third prism; and the first light beam passes through the first coating and propagates towards the seventh surface; and
    an ocular module;

wherein the prism module is disposed between the objective module and the ocular module, the first light beam sequentially passes through the objective module, the prism module and the ocular module, and central axes of the objective module and the ocular module are in parallel without overlapping.

11. The optical device as claimed in claim 10, further comprising a display unit disposed at a side of the sixth surface of the second prism and configured to emit a second light beam wherein the second light beam enters the second prism through the sixth surface, is sequentially reflected on the seventh surface and the fifth surface, passes through the sixth surface, leaves the second prism, enters the third prism through the eighth surface, is sequentially reflected on the ninth surface and the tenth surface, passes through the eighth surface, leaves the third prism, and passes through the ocular module.

12. The optical device as claimed in claim 11, wherein the first coating is configured to reflect the second light beam but allows the first light beam to pass therethrough.

13. The optical device as claimed in claim 11, further comprising a light emitter and a light receiver wherein the light emitter is configured to emit a third light beam, the light receiver is configured to receive the third light beam reflected by the object for calculating a distance between the object and the optical device, and the first coating is configured to reflect the second light beam and the third light beam but allows the first light beam to pass therethrough.

14. The optical device as claimed in claim 10, further comprising a light emitter and a light receiver wherein the light emitter is configured to emit a third light beam, the light receiver is configured to receive the third light beam reflected by the object for calculating a distance between the object and the optical device, and the first coating is formed on the third surface of the first prism and is configured to reflect the third light beam but allows the first light beam to pass therethrough.

15. The optical device as claimed in claim 14, wherein the light emitter is disposed at a side of the second surface of the first prism, the third light beam enters the first prism through the second surface, is sequentially reflected on the third surface and the fourth surface, leaves from the first surface of the first prism, passes through the objective module, leaves the optical device, reaches the object, is reflected by the object, returns to the optical device, and is received by the light receiver.

16. The optical device as claimed in claim 14, wherein the light receiver is disposed at a side of the second surface of the first prism, and the third light beam passes through the objective module, leaves the optical device, reaches the object, is reflected by the object, returns to the optical device, passes through the objective module, enters the first prism through the first surface, is sequentially reflected on the fourth surface and the third surface, leaves from the second surface of the first prism, and is received by the light receiver.

* * * * *